United States Patent
Park (10) Patent No.: US 11,376,832 B2
(45) Date of Patent: Jul. 5, 2022

(54) VACUUM PRESS APPARATUS AND METHOD

(71) Applicant: Woong Ki Park, Siheung-Shi (KR)

(72) Inventor: Woong Ki Park, Siheung-Shi (KR)

(*) Notice: Subject to any disclaimer, the term of this patent is extended or adjusted under 35 U.S.C. 154(b) by 0 days.

(21) Appl. No.: 17/086,585

(22) Filed: Nov. 2, 2020

(65) Prior Publication Data

US 2022/0040964 A1 Feb. 10, 2022

(30) Foreign Application Priority Data

Aug. 4, 2020 (KR) .................. 10-2020-0097161

(51) Int. Cl.
| | |
|---|---|
| *B32B 37/00* | (2006.01) |
| *B32B 37/06* | (2006.01) |
| *B32B 37/08* | (2006.01) |
| *B32B 37/10* | (2006.01) |

(52) U.S. Cl.
CPC .......... *B32B 37/0046* (2013.01); *B32B 37/06* (2013.01); *B32B 37/08* (2013.01); *B32B 37/1018* (2013.01); *B32B 2457/00* (2013.01)

(58) Field of Classification Search
CPC . B32B 37/0046; B32B 37/06; B32B 37/1018; B32B 37/08; B32B 2457/00
See application file for complete search history.

(56) References Cited

U.S. PATENT DOCUMENTS 4,247,355 A * 1/1981 Friedrich .......... B32B 17/10844
156/382

FOREIGN PATENT DOCUMENTS

| EP | 2236287 A2 * | 6/2010 |
|---|---|---|
| KR | 10-2010-0020217 | 2/2010 |
| KR | 10-2117990 | 6/2020 |

OTHER PUBLICATIONS

EP2236287A2 Machine Translation of Description (EPO and Google) (Year: 2021).*
EP2236287A2 Machine Translation of Claims (EPO and Google) (Year: 2021).*
IP.Com search history (Year: 2021).*

* cited by examiner

*Primary Examiner* — Cynthia L Schaller
(74) *Attorney, Agent, or Firm* — Lex IP Meister, PLLC (57) ABSTRACT

Disclosed are a vacuum press method and apparatus. The vacuum press apparatus includes an upper pressing part provided with an upper diaphragm, a lower pressing part provided with a lower diaphragm, an airtightness-maintaining member mounted between the upper pressing part and the lower pressing part, a processing space formed by the upper and lower pressing parts, the airtightness-maintaining member, and the upper and lower diaphragms, a vacuum-pressing operation part communicating with the processing space, a heating part mounted in the upper pressing part, an ascending/descending heating operation space formed between the upper diaphragm and the heating part, an upper ascending/descending operation part communicating with the ascending/descending heating operation space, a cooling part mounted in the lower pressing part, an ascending/descending cooling operation space formed between the lower diaphragm and the cooling part, and a lower ascending/descending operation part communicating with the ascending/descending cooling operation space.

7 Claims, 6 Drawing Sheets

VACUUM PRESS APPARATUS AND METHOD

BACKGROUND OF THE INVENTION

Field of the Invention

The present invention relates to a vacuum press method and apparatus for maximizing work efficiency by allowing a heating and pressing process and a cooling and pressing process to be sequentially performed on a composite material for a stacking structure of, for example, a flat panel display, a solar cell, a semiconductor, or a fuel cell, in the same processing space in a single piece of equipment.

Description of the Related Art

In general, vacuum heating and pressing technology is used for a process of heating and pressing a composite material for a stacking structure of, for example, a flat panel display, a solar cell, a semiconductor, or a fuel cell.

In a conventional method in which processes are sequentially performed in one chamber, a heating and vacuum-pressing process is performed through a forced convection heating method using an electric heater and a blower fan. After the vacuum-pressing process is performed on a workpiece in the heated state thereof, a subsequent cooling and vacuum-pressing process is also performed through a forced convection cooling method. However, this conventional method has a problem in that it takes an excessive amount of time to satisfy working conditions required for the respective processes including the heating and vacuum-pressing process and the cooling and vacuum-pressing process, and thus productivity is low.

In order to remedy the above shortcomings, there has been adopted a vacuum press method utilizing an automated production line, in which a heating and vacuum-pressing process and a cooling and vacuum-pressing process are performed separately on a workpiece in different stages. For example, there has been adopted a method of mounting both a heating device and a cooling device in one apparatus and performing a heating process or a cooling process by selectively operating the heating device or the cooling device. Specifically, a heating and vacuum-pressing process is performed by operating only the heating device without operating the cooling device, among the heating device and the cooling device mounted in one apparatus. In contrast, a cooling and vacuum-pressing process is performed through a heat conduction method by operating only the cooling device without operating the heating device, among the heating device and the cooling device mounted in one apparatus.

However, in this conventional method, in which a heating device and a cooling device are mounted in one apparatus and are selectively operated in order to sequentially perform a heating and vacuum-pressing process and a cooling and vacuum-pressing process, the temperature difference between the two processes is large, and relatively large amounts of power and time are consumed to satisfy the temperature and treatment conditions required for the respective processes. Therefore, this conventional method is uneconomical due to the low productivity thereof. Because there is no other method of solving the above problems, the conventional methods are inevitably used as they are.

As described above, the conventional methods are uneconomical because a large amount of time is taken to perform respective treatment processes and a large amount of power is consumed to operate equipment.

There has been proposed a method of providing independent spaces and sequentially performing a heating and vacuum-pressing process and a cooling and vacuum-pressing process in the respective independent spaces. However, in this case, the production line becomes long, and thus the overall size of a facility increases, leading to an increase in construction costs or maintenance and repair costs. That is, this method imposes a relatively high economic burden compared to the improvement in production efficiency.

RELATED ART DOCUMENTS

Patent Documents

1. Korean Patent Laid-Open Publication No. 10-2010-0020217 (published on Feb. 22, 2010)
2. Korean Patent Registration No. 10-2117990 (registered on Jun. 2, 2020)

SUMMARY OF THE INVENTION

The present invention has been researched and developed in order to solve the above problems, and has the following object.

It is an object of the present invention to provide a vacuum press apparatus and method capable of sequentially and independently performing a heating and vacuum-pressing process and a cooling and vacuum-pressing process on a workpiece in a single piece of equipment and rapidly satisfying the optimum temperature condition required for each of the heating process and the cooling process through a heat conduction method before performing vacuum pressing, thereby greatly reducing the size of the space occupied by the facility, reducing construction costs or maintenance and repair costs, and improving productivity.

In accordance with an aspect of the present invention, the above and other objects can be accomplished by the provision of a vacuum press apparatus including an upper pressing part configured such that an upper diaphragm is mounted between upper frames each having a hollow portion formed in the middle portion thereof, a lower pressing part configured such that a lower diaphragm is mounted between lower frames each having a hollow portion formed in the middle portion thereof, an airtightness-maintaining member mounted between the upper frames of the upper pressing part and the lower frames of the lower pressing part, a processing space formed inside the vacuum press apparatus and maintained in an airtight state by the upper frames of the upper pressing part, the lower frames of the lower pressing part, the airtightness-maintaining member, and the upper and lower diaphragms, a vacuum-pressing operation part mounted so as to communicate with the processing space, a heating part mounted adjacent to the upper diaphragm of the upper pressing part, an ascending/descending heating operation space formed between the upper diaphragm of the upper pressing part and the heating part, an upper ascending/descending operation part mounted so as to communicate with the ascending/descending heating operation space, a cooling part mounted adjacent to the lower diaphragm of the lower pressing part, an ascending/descending cooling operation space formed between the lower diaphragm of the lower pressing part and the cooling part, and a lower ascending/descending operation part mounted so as to communicate with the ascending/descending cooling operation space.

In addition, the heating part and the cooling part may be mounted in the vacuum press apparatus such that the position of the heating part and the position of the cooling part are exchanged with each other.

In addition, the vacuum press apparatus may further include another processing space formed at a position adjacent to the lower pressing part and the cooling part, another upper pressing part provided adjacent to the cooling part, and another lower pressing part equipped with another heating part therein. The other processing space may be formed between the other upper pressing part and the other lower pressing part.

In addition, the vacuum press apparatus may further include another processing space formed at a position adjacent to the upper pressing part and the heating part, another lower pressing part provided adjacent to the heating part, and another upper pressing part equipped with another cooling part therein. The other processing space may be formed between the other upper pressing part and the other lower pressing part.

In accordance with another aspect of the present invention, there is provided a vacuum press method including a loading process of placing a workpiece to be processed in an internal airtight processing space formed by upper and lower pressing parts in which diaphragms are respectively mounted, a heating and pressing process of bringing the workpiece into close contact with a heating part provided adjacent to the upper pressing part and discharging air in the processing space to the outside in the heated state of the workpiece to heat and vacuum-press the workpiece using the diaphragms of the upper and lower pressing parts, a cooling and pressing process of bringing the workpiece, having undergone the heating and pressing process, into close contact with a cooling part provided adjacent to the lower pressing part to cool and vacuum-press the workpiece, and an unloading process of, after the cooling and pressing process, introducing external air into the processing space to generate an atmospheric pressure in the processing space and separating the upper and lower pressing parts from each other to withdraw the processed workpiece to the outside.

In addition, in the heating and pressing process, when the workpiece is brought into close contact with the heating part, the heating part may be maintained in a stationary state, and the workpiece may be moved toward the heating part together with the diaphragms of the upper and lower pressing parts.

In addition, in the cooling and pressing process, when the workpiece is brought into close contact with the cooling part, the cooling part may be maintained in a stationary state, and the workpiece may be moved toward the cooling part together with the diaphragms of the upper and lower pressing parts.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described concretely in detail with reference to the accompanying drawings.

Figure 1:
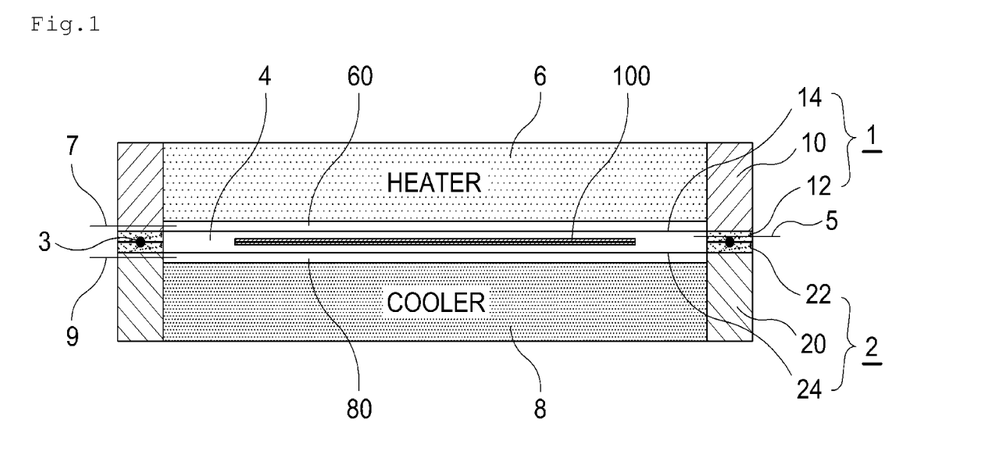
FIG. 1 is a schematic longitudinal sectional view of an exemplary embodiment of the present invention.

As illustrated in FIG. 1, a vacuum press apparatus according to an exemplary embodiment of the present invention includes an upper pressing part 1, which is configured such that an upper diaphragm 14 is mounted between upper frames 10 and 12 each having a hollow portion formed in the middle portion thereof, a lower pressing part 2, which is configured such that a lower diaphragm 24 is mounted between lower frames 20 and 22 each having a hollow portion formed in the middle portion thereof, an airtightness-maintaining member 3, which is mounted between the upper frames 10 and 12 of the upper pressing part 1 and the lower frames 20 and 22 of the lower pressing part 2, a processing space 4, which is formed inside the vacuum press apparatus and is maintained in an airtight state by the upper frames 10 and 12 of the upper pressing part 1, the lower frames 20 and 22 of the lower pressing part 2, the airtightness-maintaining member 3, and the upper and lower diaphragms 14 and 24, a vacuum-pressing operation part 5, which is mounted so as to communicate with the processing space 4, a heating part 6, which is mounted adjacent to the upper diaphragm 14 of the upper pressing part 1, an ascending/descending heating operation space 60, which is formed between the upper diaphragm 14 of the upper pressing part 1 and the heating part 6, an upper ascending/descending operation part 7, which is mounted so as to communicate with the ascending/descending heating operation space 60, a cooling part 8, which is mounted adjacent to the lower diaphragm 24 of the lower pressing part 2, an ascending/descending cooling operation space 80, which is formed between the lower diaphragm 24 of the lower pressing part 2 and the cooling part 8, and a lower ascending/descending operation part 9, which is mounted so as to communicate with the ascending/descending cooling operation space 80.

In this case, the upper frames 10 and 12 of the upper pressing part 1 and the lower frames 20 and 22 of the lower pressing part 2 are made of a rigid material such as, for example, a high-strength aluminum alloy or stainless steel, having excellent corrosion resistance, in order to prevent deformation thereof when a predetermined process is performed using the vacuum pressure inside the processing space 4.

The upper and lower diaphragms 14 and 24 are implemented as an elastic sheet body that is made of a material having excellent elasticity such as, for example, silicon rubber.

The vacuum-pressing operation part 5, which is mounted so as to communicate with the processing space 4, is implemented in the form of a vacuum pipe line including a vacuum pump installed outside the processing space 4.

The heating part 6, which is mounted adjacent to the upper diaphragm 14 of the upper pressing part 1, is implemented, for example, in the form of a heating plate in which an electric heater is embedded. The cooling part 8, which is mounted adjacent to the lower diaphragm 24 of the lower pressing part 2, is implemented, for example, in the form of a cooling plate through which a refrigerant passes or a cooling plate using a Peltier element.

The upper ascending/descending operation part 7, which is mounted so as to communicate with the ascending/descending heating operation space 60, or the lower ascending/descending operation part 9, which is mounted so as to communicate with the ascending/descending cooling operation space 80, is configured to selectively connect a vacuum pipe line including a vacuum pump and a compression pipe line including a compressor and to control the same.

Figure 2:
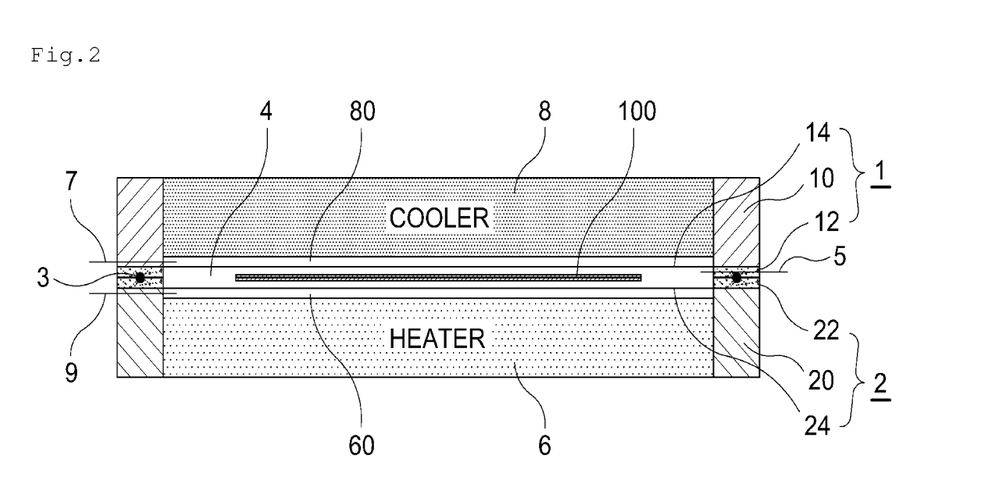
FIG. 2 is a schematic longitudinal sectional view of another exemplary embodiment of the present invention.

Alternatively, unlike the configuration of the embodiment described above, the position of the heating part 6 and the position of the cooling part 8 are exchanged with each other. Described in detail, as illustrated in FIG. 2, a vacuum press apparatus according to another exemplary embodiment of the present invention has the same structure as the above-described embodiment illustrated in FIG. 1 in that an upper pressing part 1 is configured such that an upper diaphragm 14 is mounted between upper frames 10 and 12 each having a hollow portion formed in the middle portion thereof, a lower pressing part 2 is configured such that a lower diaphragm 24 is mounted between lower frames 20 and 22 each having a hollow portion formed in the middle portion thereof, an airtightness-maintaining member 3 is mounted between the upper frames 10 and 12 of the upper pressing part 1 and the lower frames 20 and 22 of the lower pressing part 2, a processing space 4 is formed inside the vacuum press apparatus and is maintained in an airtight state by the upper frames 10 and 12 of the upper pressing part 1, the lower frames 20 and 22 of the lower pressing part 2, the airtightness-maintaining member 3, and the upper and lower diaphragms 14 and 24, a vacuum-pressing operation part 5 is mounted so as to communicate with the processing space 4, and upper and lower ascending/descending operation parts 7 and 9 are provided. However, the embodiment illustrated in FIG. 2 has a structure different from that of the embodiment illustrated in FIG. 1 in that a cooling part 8 is mounted adjacent to the upper diaphragm 14 of the upper pressing part 1, an ascending/descending cooling operation space 80 is formed between the upper diaphragm 14 of the upper pressing part 1 and the cooling part 8, a heating part 6 is mounted adjacent to the lower diaphragm 24 of the lower pressing part 2, and an ascending/descending heating operation space 60 is formed between the lower diaphragm 24 of the lower pressing part 2 and the heating part 6.

Figure 3:
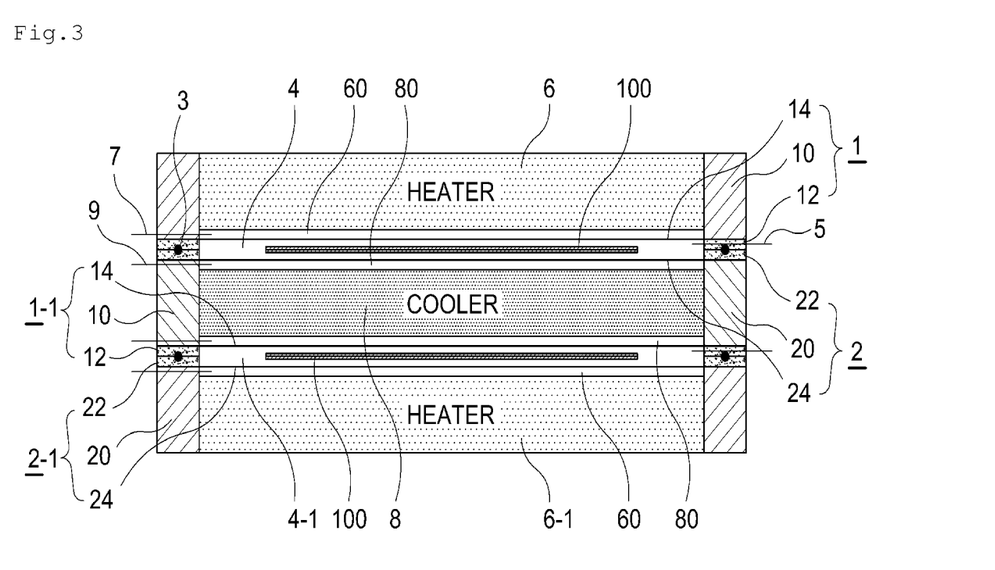
FIG. 3 is a schematic longitudinal sectional view of still another exemplary embodiment of the present invention.

Alternatively, as illustrated in FIG. 3, another processing space 4-1 is formed at a position adjacent to the lower pressing part 2 and the cooling part 8 illustrated in FIG. 1. Described in detail, another upper pressing part 1-1 is provided adjacent to the cooling part 8, another lower pressing part 2-1 equipped with a separate heating part 6-1 therein is provided, and the other processing space 4-1 is additionally formed between the other upper pressing part 1-1 and the other lower pressing part 2-1, thereby allowing a predetermined process to be performed simultaneously in the two processing spaces 4 and 4-1, which are respectively disposed at the upper side and the lower side.

Figure 4:
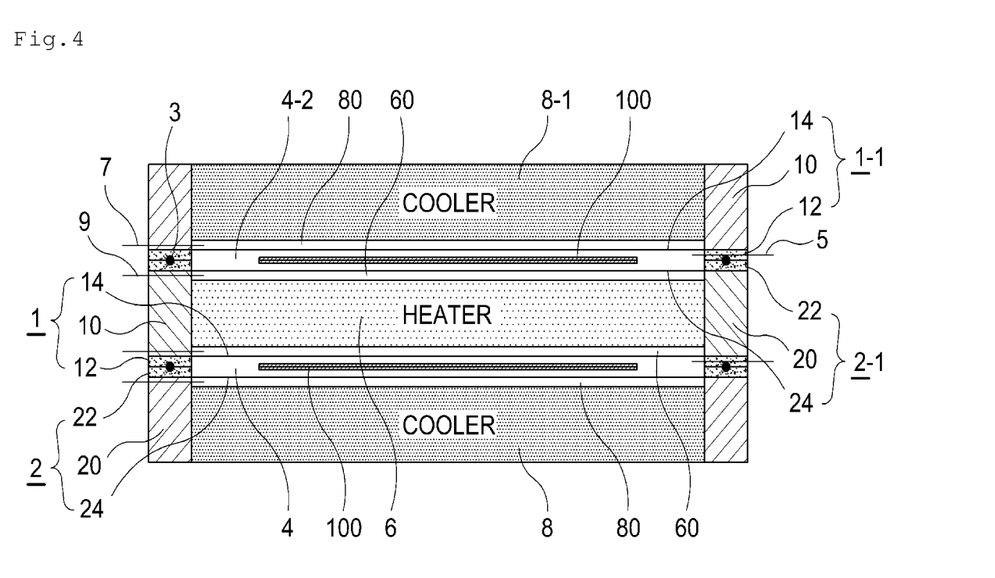
FIG. 4 is a schematic longitudinal sectional view of still another exemplary embodiment of the present invention.

Alternatively, as illustrated in FIG. 4, another processing space 4-2 is formed at a position adjacent to the upper pressing part 1 and the heating part 6 illustrated in FIG. 1. Described in detail, another lower pressing part 2-1 is provided adjacent to the heating part 6, another upper pressing part 1-1 equipped with a separate cooling part 8-1 therein is provided, and the other processing space 4-2 is additionally formed between the other upper pressing part 1-1 and the other lower pressing part 2-1, thereby allowing a predetermined process to be performed simultaneously in the two processing spaces 4-2 and 4, which are respectively disposed at the upper side and the lower side.

The vacuum press apparatuses according to the present invention configured as described above are operated through a vacuum press method according to the present invention, which will be described below.

Although various types of vacuum press apparatuses according to the present invention are illustrated in FIGS. 1 to 4, the actual operation processes thereof are the same as or extremely similar to each other, and thus the following description will focus on the embodiment illustrated in FIG. 1.

Described in brief, a vacuum press method according to the present invention includes a loading process of placing a workpiece 100 to be processed in the internal airtight processing space 4 formed by the upper and lower pressing parts 1 and 2 in which the diaphragms 14 and 24 are respectively mounted, a heating and pressing process of bringing the workpiece 100 into close contact with the heating part 6 provided adjacent to the upper pressing part and discharging air in the processing space 4 to the outside in the heated state of the workpiece 100 to heat and vacuum-press the workpiece 100 using the diaphragms 14 and 24 of the upper and lower pressing parts 1 and 2, a cooling and pressing process of bringing the workpiece 100, having undergone the heating and pressing process, into close contact with the cooling part 8 provided adjacent to the lower pressing part 2 to cool and vacuum-press the workpiece 100, and an unloading process of, after the cooling and pressing process, introducing external air into the processing space 4 to generate atmospheric pressure in the processing space 4 and separating the upper and lower pressing parts 1 and 2 from each other to withdraw the processed workpiece 100 to the outside.

Hereinafter, the processes described briefly above will be described in greater detail.

Loading Process

Figure 5:
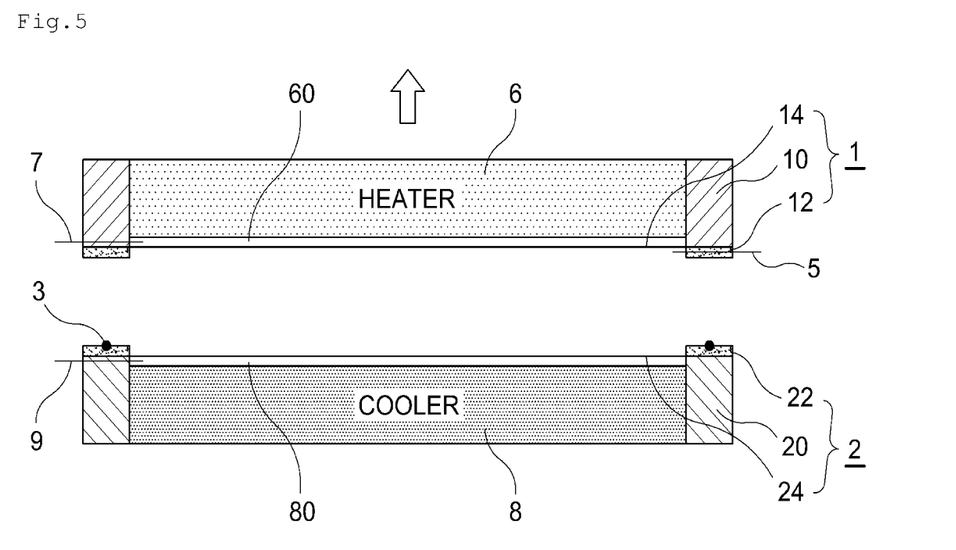
FIGS. 5 to 12 are views sequentially showing the operation of the apparatus illustrated in FIG. 1 in order to explain a vacuum press method according to an exemplary embodiment of the present invention.
Figure 6:
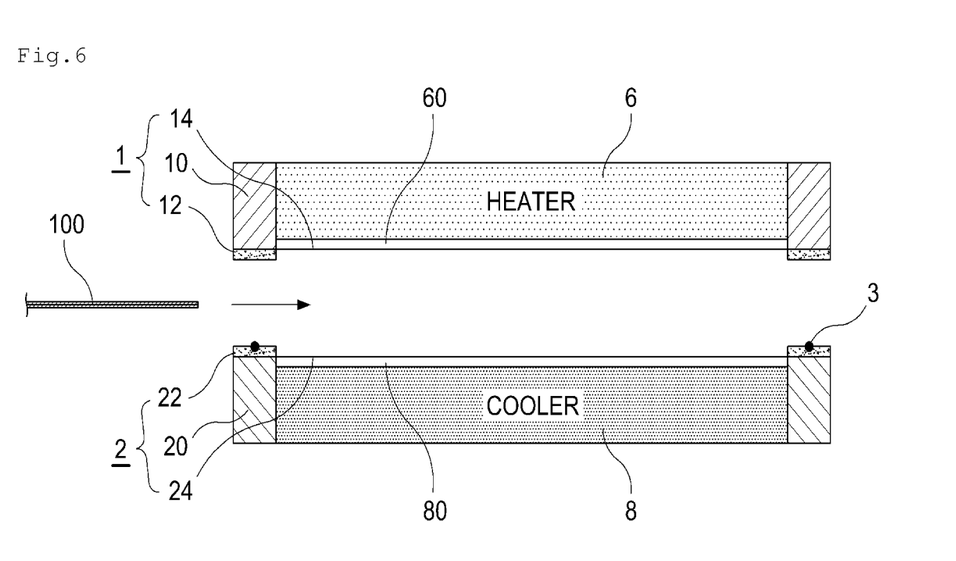
Figure 7:
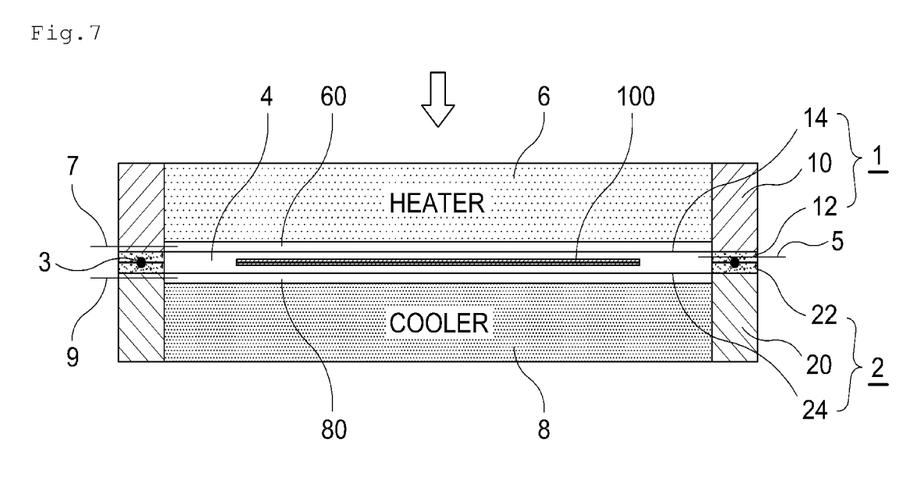

This process is a process of placing a workpiece 100 to be processed in the internal airtight processing space 4 formed by the upper and lower pressing parts 1 and 2 in which the diaphragms 14 and 24 are respectively mounted. As illustrated in FIG. 5, the upper pressing part 1 is moved upwards in order to open the processing space 4. Subsequently, as illustrated in FIG. 6, the workpiece 100 is placed in the processing space 4. Subsequently, as illustrated in FIG. 7, the upper pressing part 1 is moved downwards to the original position thereof so as to be brought into close contact with the lower pressing part 2, and the interior of the processing space 4 is maintained in an airtight state by the airtightness-maintaining member 3, thereby completing the preparation work.

Heating and Pressing Process

Figure 8:
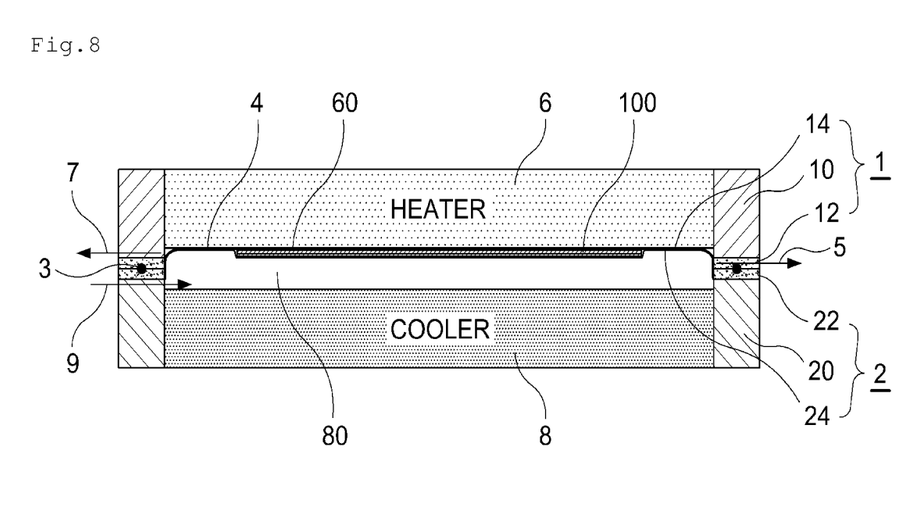

After the preparation work for processing the workpiece 100 is completed through the above-described loading process, the heating and pressing process is performed such that the workpiece 100 is brought into close contact with the heating part 6 provided adjacent to the upper pressing part 1 so as to be heated, and is pressed in the heated state thereof. As illustrated in FIG. 8, air in the processing space 4 is discharged to the outside by the vacuum-pressing operation part 5 so that vacuum-pressing operation is performed on the workpiece 100 by the diaphragms 14 and 24 of the upper and lower pressing parts 1 and 2. In this state, the workpiece 100 is brought into close contact with the heating part 6 so that heat is transferred between the workpiece 100 and the heating part 6 through heat conduction.

In the process of heating and pressing the workpiece 100, when the workpiece 100 is brought into close contact with the heating part 6, the heating part 6 is maintained in a stationary state, and the workpiece 100 is moved toward the heating part 6 together with the diaphragms 14 and 24 of the upper and lower pressing parts 1 and 2. Specifically, air present in the ascending/descending heating operation space 60 between the upper diaphragm 14 and the heating part 6 is discharged to the outside by the upper ascending/descending operation part 7 so that a vacuum (negative pressure) is generated in the ascending/descending heating operation space 60, and compressed air is introduced from the outside into the ascending/descending cooling operation space 80 between the lower diaphragm 24 and the cooling part 8 by the lower ascending/descending operation part 9, so that the internal pressure in the ascending/descending cooling operation space 80 is increased, with the result that the workpiece 100 located between the upper and lower diaphragms 14 and 24 is moved so as to be brought into close contact with the heating part 6.

Cooling and Pressing Process

Figure 9:
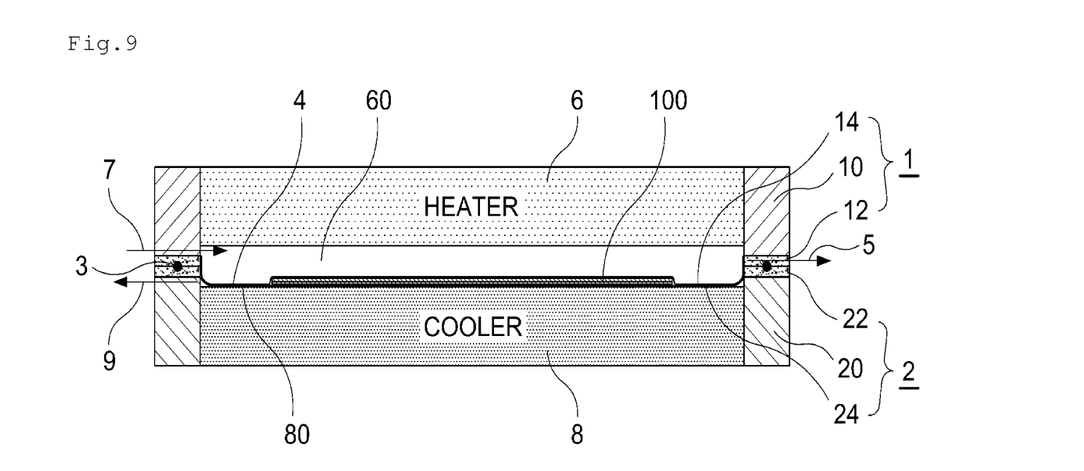

After the above-described heating and pressing process is completed, the cooling and pressing process is performed such that the workpiece 100, having undergone vacuum pressing, is brought into close contact with the cooling part 8 provided adjacent to the lower pressing part 2 so as to be cooled, and is pressed in the cooled state thereof. As illustrated in FIG. 9, in the state in which the vacuum-pressing operation is performed on the workpiece 100 by the diaphragms 14 and 24 of the upper and lower pressing parts 1 and 2, air in the processing space 4 is discharged to the outside by the vacuum-pressing operation part 5, whereby the workpiece 100 is brought into close contact with the cooling part 8 so that heat is transferred between the workpiece 100 and the cooling part 8 through heat conduction.

In the process of cooling and pressing the workpiece 100, when the workpiece 100 is brought into close contact with the cooling part 8, the cooling part 8 is maintained in a stationary state, and the workpiece 100 is moved toward the cooling part 8 together with the diaphragms 14 and 24 of the upper and lower pressing parts 1 and 2. Specifically, air present in the ascending/descending cooling operation space 80 between the lower diaphragm 24 and the cooling part 8 is discharged to the outside by the lower ascending/descending operation part 9 so that a vacuum (negative pressure) is generated in the ascending/descending cooling operation space 80, and compressed air is introduced from the outside into the ascending/descending heating operation space 60 between the upper diaphragm 14 and the heating part 6 by the upper ascending/descending operation part 7, so that the internal pressure in the ascending/descending heating operation space 60 is increased, with the result that the workpiece 100 located between the upper and lower diaphragms 14 and 24 is moved so as to be brought into close contact with the cooling part 8.

Unloading Process

After the cooling and pressing process is completed, the unloading process is performed such that the upper ascending/descending operation part 7, the vacuum-pressing operation part 5 and the lower ascending/descending operation part 9 are operated so as to generate atmospheric pressure in the space between the upper diaphragm 14 and the heating part 6, the processing space 4, and the space between the lower diaphragm 24 and the cooling part 8, and such that the upper and lower pressing parts 1 and 2 are separated from each other to allow the processed workpiece 100 to be withdrawn to the outside.

Figure 10:
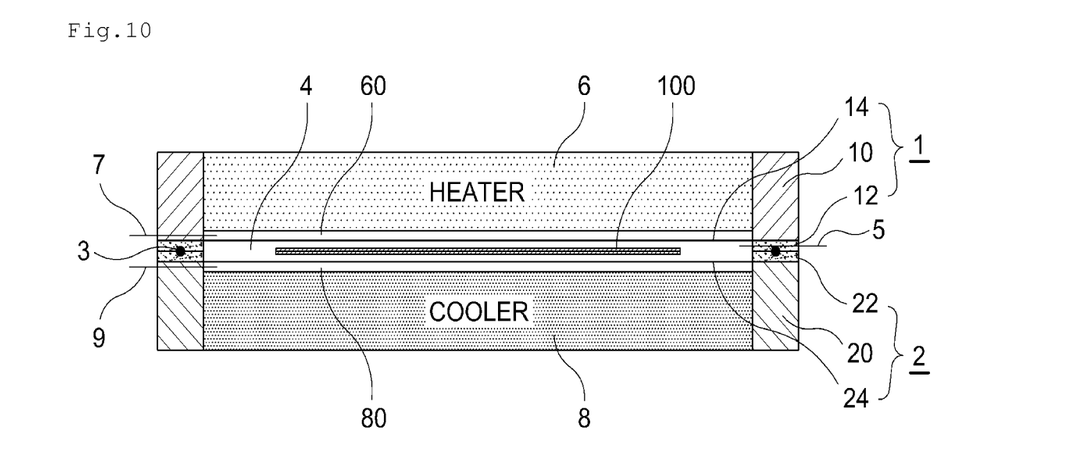
Figure 11:
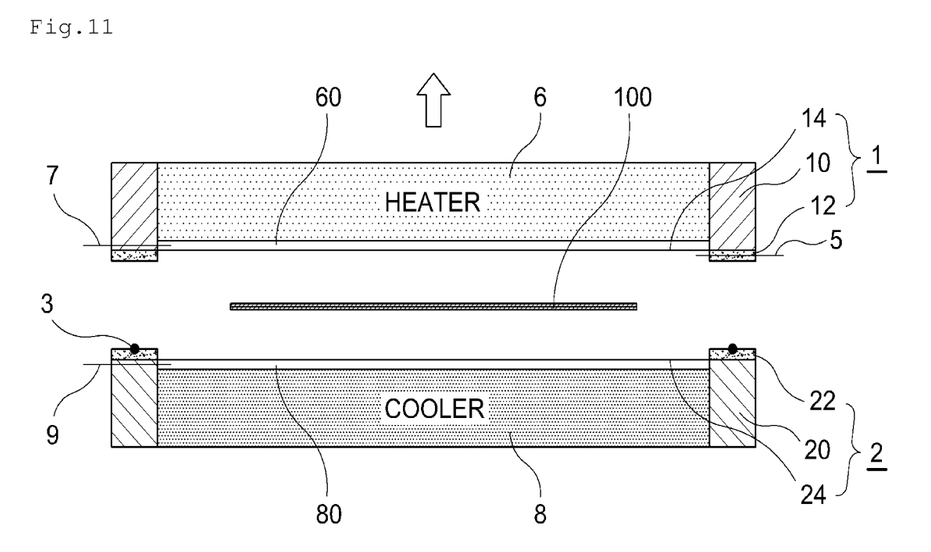
Figure 12:
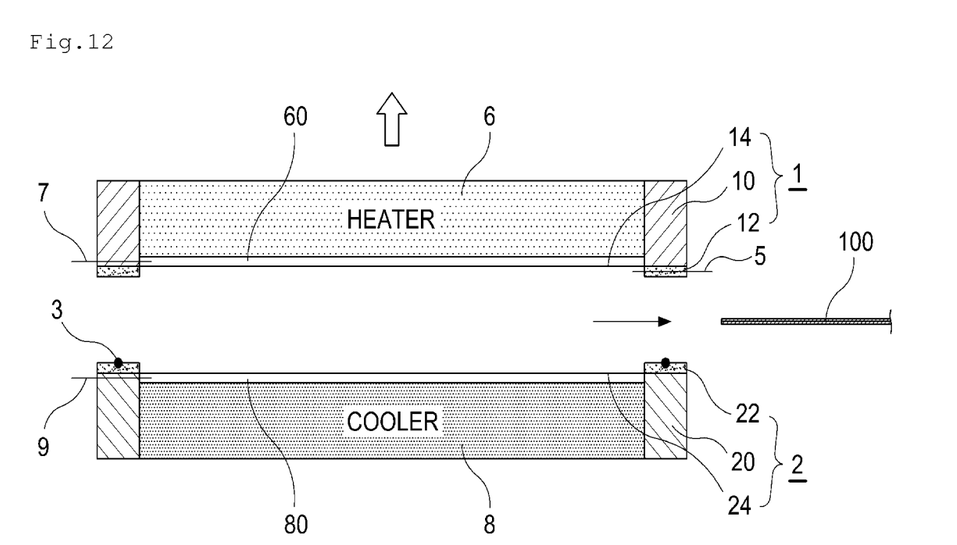

Specifically, as illustrated in FIG. 10, the upper ascending/descending operation part 7 is operated to discharge pressing air in the space between the upper diaphragm 14 and the heating part 6 to the outside, thereby releasing the pressed state of the workpiece 100. The vacuum-pressing operation part 5 is operated to introduce external air into the processing space 4, thereby releasing the state in which the workpiece 100 is pressed by the vacuum (negative pressure). The lower ascending/descending operation part 9 is operated to introduce external air into the space between the lower diaphragm 24 and the cooling part 8, thereby releasing the state in which the workpiece 100 is pressed by the vacuum (negative pressure). In this way, after the internal state of each of the space between the upper diaphragm 14 and the heating part 6, the processing space 4, and the space between the lower diaphragm 24 and the cooling part 8 is changed to the initial atmospheric pressure state, the upper and lower pressing parts 1 and 2 are separated from each other, as illustrated in FIG. 11. Thereafter, as illustrated in FIG. 12, the processed workpiece 100 is withdrawn to the outside.

As described above, in the vacuum press method according to an exemplary embodiment of the present invention, the loading process, the heating and pressing process, the cooling and pressing process, and the unloading process are sequentially performed.

As is apparent from the above description, a vacuum press method and apparatus according to the present invention are capable of sequentially performing a heating and pressing process for heating and vacuum-pressing a workpiece and a cooling and pressing process for cooling and vacuum-pressing the workpiece in the same space in a single piece of equipment and of rapidly satisfying the optimum temperature condition required for each of the heating process and the cooling process through a heat conduction method before performing vacuum pressing, thereby greatly reducing the size of the space occupied by the facility, reducing construction costs or maintenance and repair costs, and greatly improving productivity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A vacuum press apparatus comprising:
    an upper pressing part comprising an upper frame having an upper hollow portion formed in a middle portion thereof and an upper diaphragm mounted on the upper frame to cover the upper hollow portion;
    a lower pressing part comprising a lower frame having a lower hollow portion formed in a middle portion thereof and a lower diaphragm mounted on the lower frame to cover the lower hollow portion;
    an airtightness-maintaining member mounted between the upper frame of the upper pressing part and the lower frame of the lower pressing part;
    a processing space formed between the upper and lower diaphragms and maintained in an airtight state by the upper frame of the upper pressing part, the lower frame of the lower pressing part, the airtightness-maintaining member, and the upper and lower diaphragms;
    a vacuum-pressing operation part mounted so as to communicate with the processing space;

a heating part mounted adjacent to the upper diaphragm of the upper pressing part;
an upper ascending/descending heating operation space formed between the upper diaphragm of the upper pressing part and the heating part;
an upper ascending/descending operation part mounted so as to communicate with the upper ascending/descending heating operation space;
a cooling part mounted adjacent to the lower diaphragm of the lower pressing part;
a lower ascending/descending cooling operation space formed between the lower diaphragm of the lower pressing part and the cooling part; and
a lower ascending/descending operation part mounted so as to communicate with the lower ascending/descending cooling operation space;
wherein at least a portion of the heating part is accommodated in the upper hollow portion and blocks an upper end of the upper hollow portion, thereby the upper ascending/descending heating operation space being formed by the upper diaphragm, the upper frame of the upper pressing part and the heating part, and
wherein at least a portion of the cooling part is accommodated in the lower hollow portion and blocks a lower end of the lower hollow portion, thereby the lower ascending/descending cooling operation space being formed by the lower diaphragm, the lower frame of the lower pressing part and the cooling part.

2. A vacuum press apparatus comprising:
an upper pressing part comprising upper frame having an upper hollow portion formed in a middle portion thereof and an upper diaphragm mounted on the upper frame to cover the upper hollow portion;
a lower pressing part comprising lower frame having a lower hollow portion formed in a middle portion thereof and a lower diaphragm mounted on the lower frame to cover the lower hollow portion;
an airtightness-maintaining member mounted between the upper frame of the upper pressing part and the lower frame of the lower pressing part;
a processing space formed between the upper and lower diaphragms and maintained in an airtight state by the upper frame of the upper pressing part, the lower frame of the lower pressing part, the airtightness-maintaining member, and the upper and lower diaphragms;
a vacuum-pressing operation part mounted so as to communicate with the processing space;
a cooling part mounted adjacent to the upper diaphragm of the upper pressing part;
an upper ascending/descending cooling operation space formed between the upper diaphragm of the upper pressing part and the cooling part;
an upper ascending/descending operation part mounted so as to communicate with the upper ascending/descending cooling operation space;
a heating part mounted adjacent to the lower diaphragm of the lower pressing part;
a lower ascending/descending heating operation space formed between the lower diaphragm of the lower pressing part and the heating part; and
a lower ascending/descending operation part mounted so as to communicate with the lower ascending/descending heating operation space,
wherein at least a portion of the cooling part is accommodated in the upper hollow portion and blocks an upper end of the upper hollow portion, thereby the upper ascending/descending cooling operation space being formed by the upper diaphragm, the upper frame of the upper pressing part, and the cooling part, and
wherein at least a portion of the heating part is accommodated in the lower hollow portion and blocks a lower end of the lower hollow portion, thereby the lower ascending/descending heating operation space being formed by the lower diaphragm, the lower frame of the lower pressing part, and the heating part.

3. The vacuum press apparatus according to claim 1, further comprising:
another processing space formed at a position adjacent to the lower pressing part and the cooling part;
another upper pressing part provided adjacent to the cooling part; and
another lower pressing part equipped with another heating part therein,
wherein the other processing space is formed between the other upper pressing part and the other lower pressing part.

4. The vacuum press apparatus according to claim 1, further comprising:
another processing space formed at a position adjacent to the upper pressing part and the heating part;
another lower pressing part provided adjacent to the heating part; and
another upper pressing part equipped with another cooling part therein,
wherein the other processing space is formed between the other upper pressing part and the other lower pressing part.

5. A vacuum press method comprising:
a loading process of placing a workpiece to be processed in an internal airtight processing space formed by an upper pressing part having an upper frame with an upper hollow portion and an upper diaphragm covering the upper hollow portion and a lower pressing part having a lower frame with a lower hollow portion and a lower diaphragm covering the lower hollow portion, wherein the internal airtight processing space is formed between the upper diaphragm and the lower diaphragm;
a heating and pressing process of bringing the workpiece into close contact with a heating part provided adjacent to the upper pressing part and discharging air in the processing space to an outside in a heated state of the workpiece to heat and vacuum-press the workpiece using the diaphragms of the upper and lower pressing parts;
a cooling and pressing process of bringing the workpiece, having undergone the heating and pressing process, into close contact with a cooling part provided adjacent to the lower pressing part to cool and vacuum-press the workpiece; and
an unloading process of, after the cooling and pressing process, introducing external air into the processing space to generate an atmospheric pressure in the processing space and separating the upper and lower pressing parts from each other to withdraw the workpiece to an outside,
wherein at least a portion of the heating part is accommodated in the upper hollow portion and blocks an upper end of the upper hollow portion, thereby an upper ascending/descending heating operation space being formed by the upper diaphragm, the upper frame of the upper pressing part and the heating part,
wherein the upper ascending/descending heating operation space is decreased in the heating and pressing process, wherein at least a portion of the cooling part is accommodated in the lower hollow portion and blocks a lower end of the lower hollow portion, thereby a lower ascending/descending cooling operation space being formed by the lower diaphragm, the lower frame of the lower pressing part and the cooling part, and wherein the lower ascending/descending cooling operation space is decreased in the cooling and pressing process.

6. The vacuum press method according to claim 5, wherein, in the heating and pressing process, when the workpiece is brought into close contact with the heating part, the heating part is maintained in a stationary state, and the workpiece is moved toward the heating part together with the diaphragms of the upper and lower pressing parts.

7. The vacuum press method according to claim 5, wherein, in the cooling and pressing process, when the workpiece is brought into close contact with the cooling part, the cooling part is maintained in a stationary state, and the workpiece is moved toward the cooling part together with the diaphragms of the upper and lower pressing parts.

\* \* \* \* \*